United States Patent [19]
Le Marer et al.

[11] Patent Number: 5,748,820
[45] Date of Patent: May 5, 1998

[54] COMPONENT FOR CONNECTION TO A MULTI-CORE FIBER, AND A METHOD OF MANUFACTURE

[75] Inventors: René Le Marer, Tregastel; Gabrielle Perrin, Ploubezre, both of France

[73] Assignee: France Telecom, France

[21] Appl. No.: 408,269

[22] Filed: Mar. 21, 1995

[30] Foreign Application Priority Data

Mar. 24, 1994 [FR] France .................................. 94 03467
Dec. 28, 1994 [FR] France .................................. 94 15775

[51] Int. Cl.⁶ .............................. G02B 6/00; G02B 6/36
[52] U.S. Cl. ........................................................... 385/76
[58] Field of Search ............................ 385/43, 76, 147, 385/124, 125, 126

[56] References Cited

U.S. PATENT DOCUMENTS

| | | | |
|---|---|---|---|
| 4,715,876 | 12/1987 | Osaka et al. .............................. | 385/85 X |
| 5,138,677 | 8/1992 | Shaughnessy et al. ..................... | 385/43 |
| 5,175,779 | 12/1992 | Mortimore .................................. | 385/43 |
| 5,373,572 | 12/1994 | Arkwright et al. ......................... | 385/43 |
| 5,408,554 | 4/1995 | Cryan et al. ................................ | 385/43 |
| 5,459,804 | 10/1995 | Stowe ....................................... | 385/43 X |

FOREIGN PATENT DOCUMENTS

| | | | |
|---|---|---|---|
| A-0 107 840 | 10/1983 | European Pat. Off. | ......... C03C 25/06 |
| A-0 137 501 | 10/1984 | European Pat. Off. | .......... G02B 6/28 |
| A-0 174 013 | 9/1985 | European Pat. Off. | .......... G02B 6/38 |
| A-0 611 973 | 2/1994 | European Pat. Off. | .......... G02B 6/16 |
| A-2 393 329 | 5/1977 | France | .............................. G02B 6/40 |
| 2 632 735 | 6/1988 | France | .............................. G02B 6/24 |
| A-23 63 984 | 6/1975 | Germany | ......................... G02B 6/40 |

OTHER PUBLICATIONS

Electronics Letters, vol. 27, No. 17, Aug. 15, 1991, Stevenage GB, pp. 1559–1560.

*Primary Examiner*—Akm E. Ullah
*Attorney, Agent, or Firm*—Blakely Sokoloff Taylor & Zafman

[57] ABSTRACT

The connection component comprises a plurality of optical fibers united at a common end in such a manner that their claddings are mutually tangential and the axes of their cores occupy a configuration that corresponds to the configuration of the axes of a multi-core with which said common end is to be connected, said fibers being free from one another at their opposite ends. The method brings the fibers together by depositing a drop of liquid thereon.

20 Claims, 7 Drawing Sheets

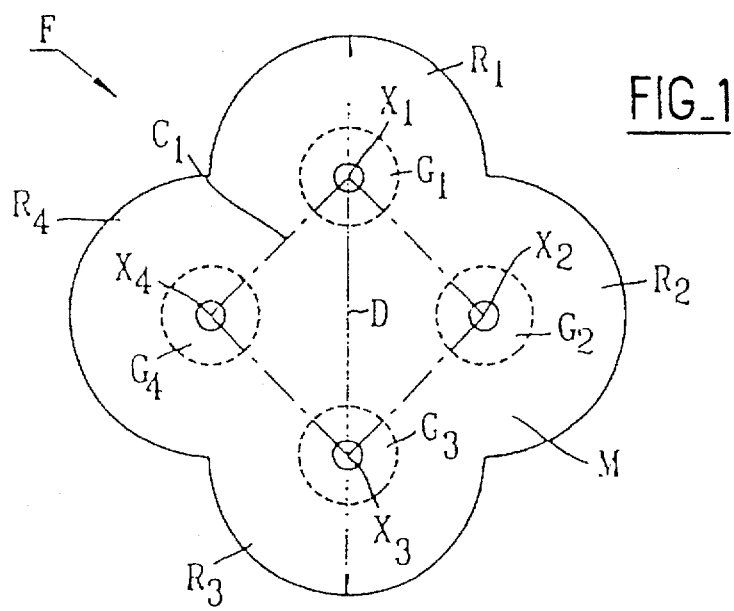
FIG_1
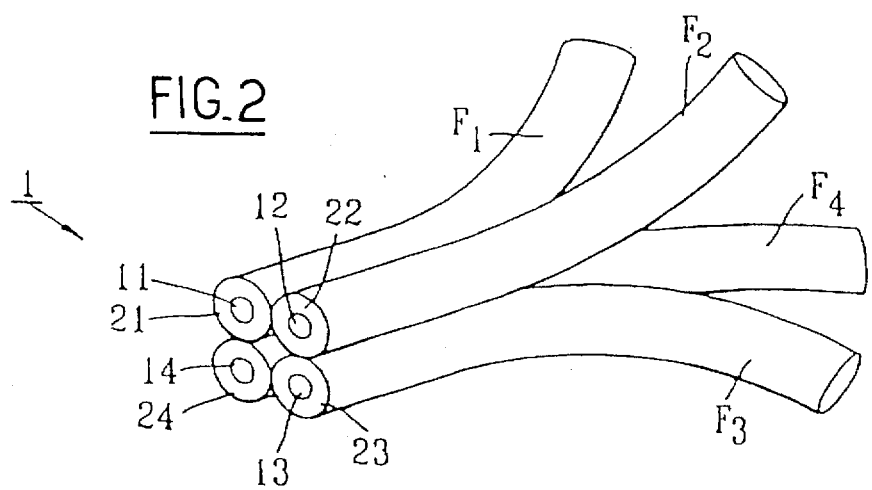
FIG_2
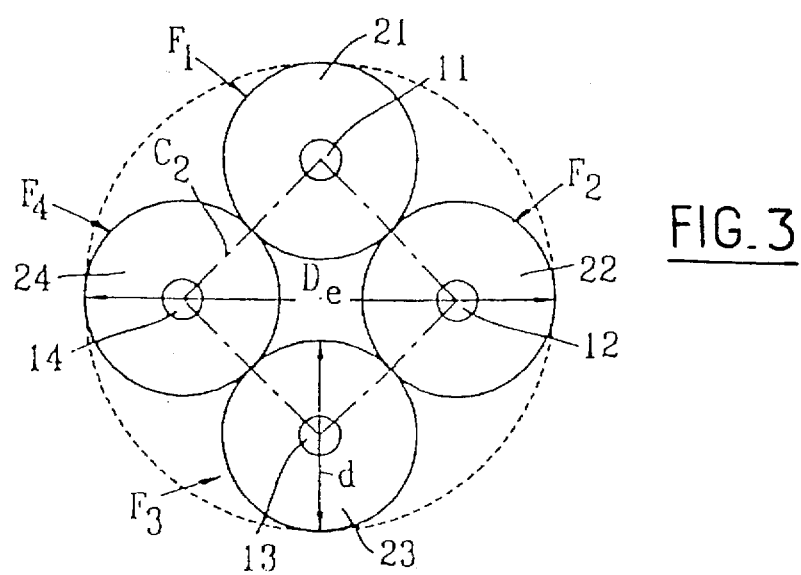
FIG_3

FIG_4
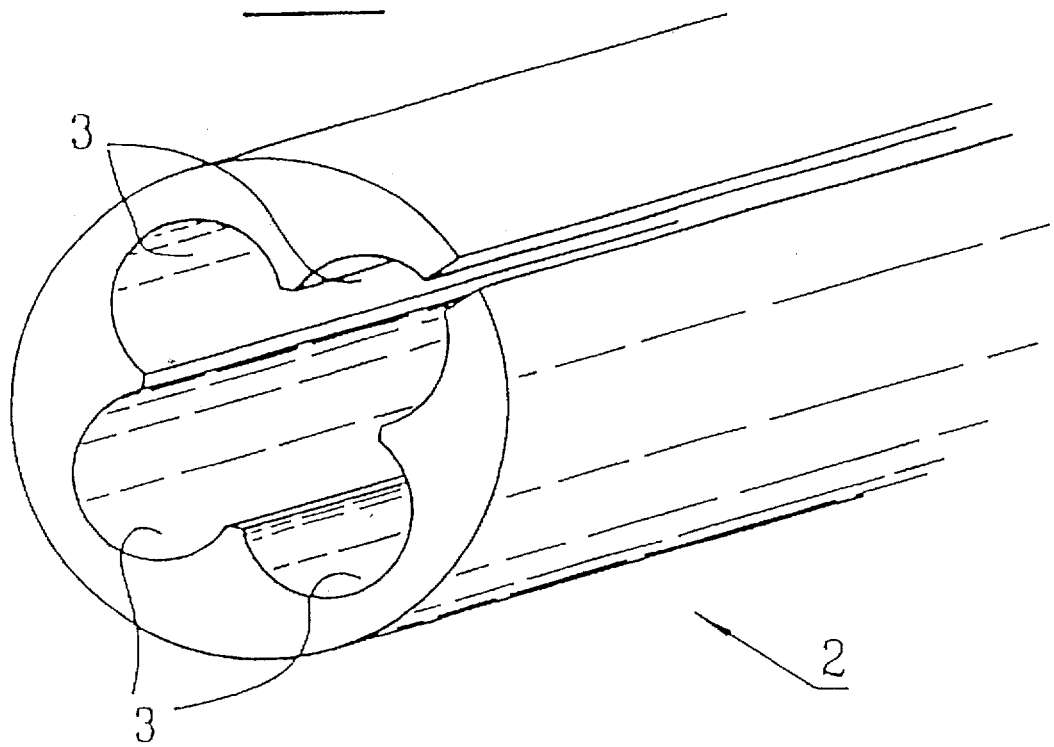
FIG_5a
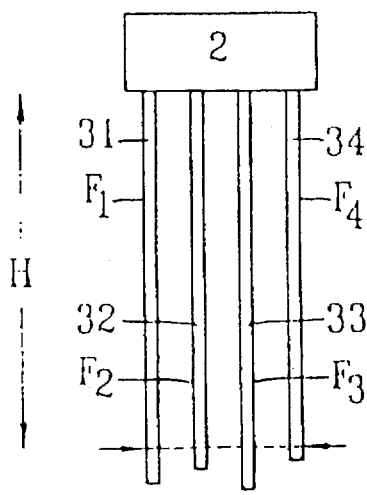
FIG_5b
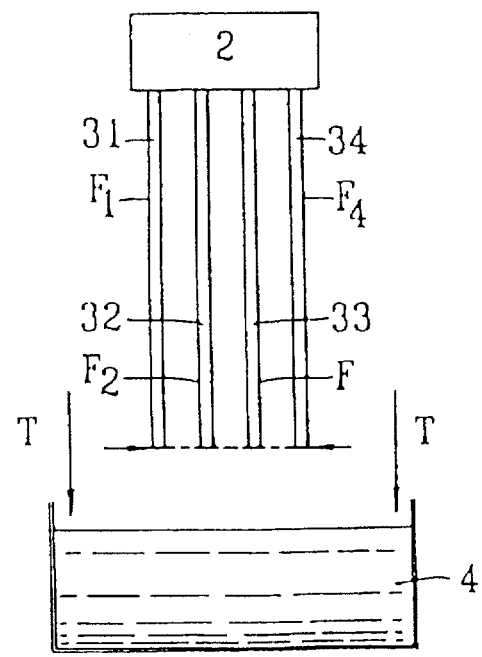

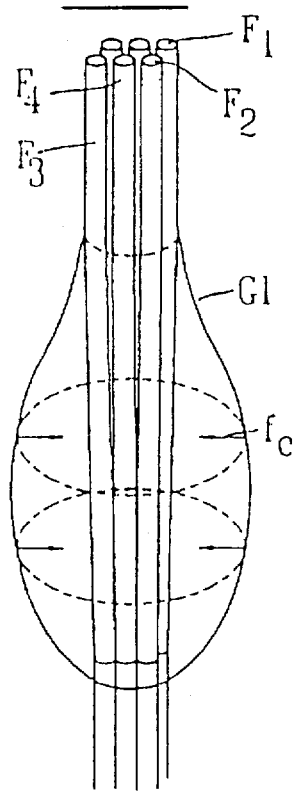
FIG_8
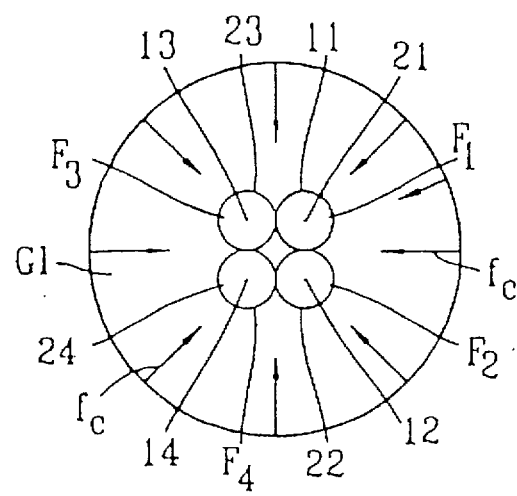
FIG_9
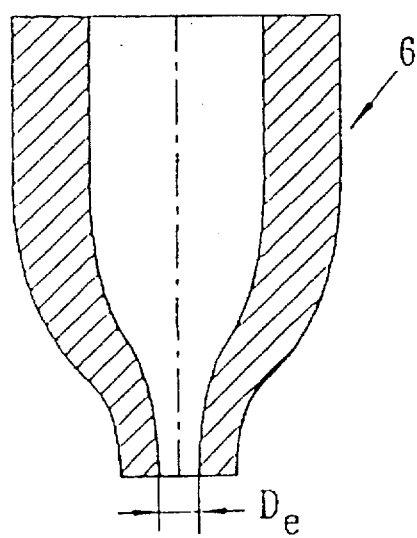
FIG_12
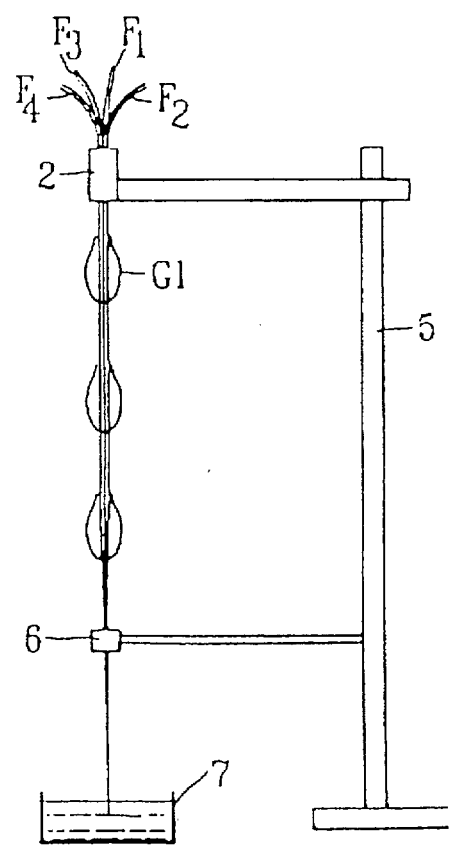
FIG_10

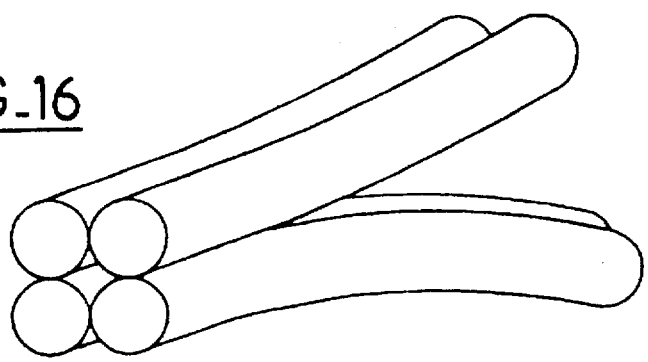
FIG.16
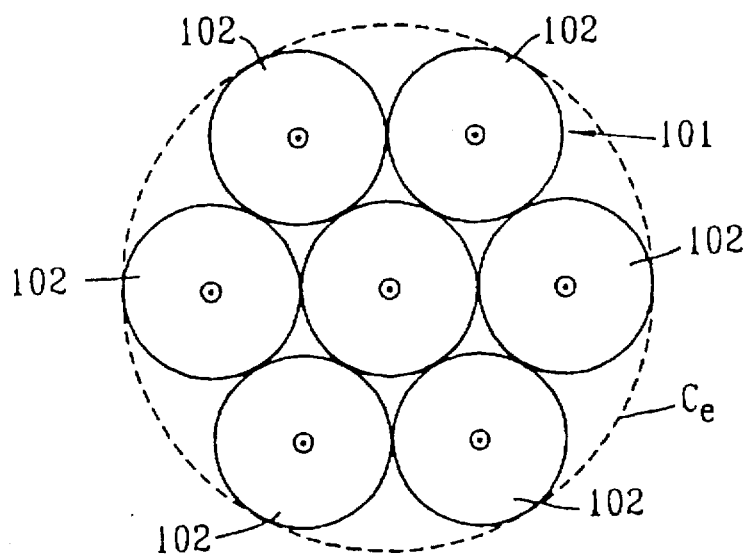
FIG.17
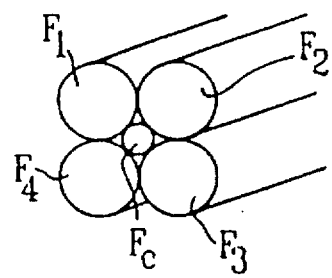
FIG.20
FIG.18
FIG.19
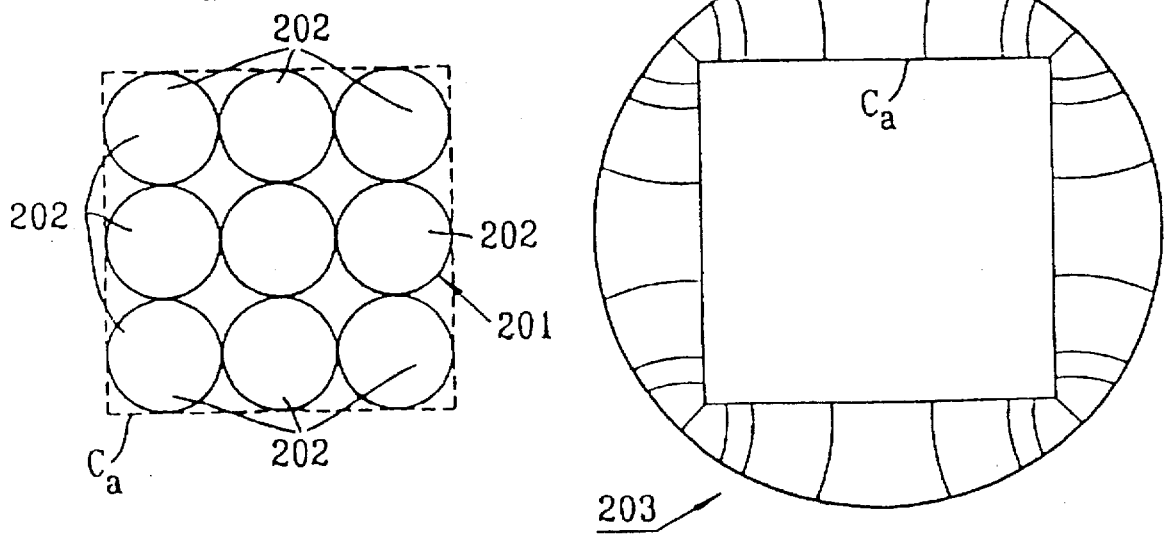

COMPONENT FOR CONNECTION TO A MULTI-CORE FIBER, AND A METHOD OF MANUFACTURE

The present invention relates to a component for connecting a plurality of optical fibers to a multi-core optical fiber. The invention also relates to a method of making such a component.

BACKGROUND OF THE INVENTION

Multi-core optical fibers are optical waveguides that include a plurality of parallel waveguide cores within a single linear matrix.

Proposals have recently been made, in particular in the French patent application filed under the number 93-01674, for an optical waveguide that presents a plurality of cores within a common matrix, each core being surrounded by its own optical cladding. The axes of the cores are disposed in the matrix in such a manner as to present geometrical relationships between one another that are highly accurate, with the respective positions of the axes of the cores being defined to an accuracy of a few tenths of a micrometer.

FIG. 1 shows an example of an optical fiber F of that type. The fiber F comprises a matrix M containing four unit waveguides $G_1$ to $G_4$ having respective axes $X_1$ to $X_4$ that, in cross-section, form the vertices of a highly accurate square $C_1$. The outline of the matrix M is defined by four identical circular cylinder portions $R_1$ to $R_4$, whose axes coincide with the axes $X_1$ to $X_4$ respectively of the individual light waveguides.

The multi-core fiber F may have a maximum outside diameter D equal to 125 μm, with the side of the square $C_1$ formed by the axes $X_1$ to $X_4$ being 44 μm.

Multi-core optical fibers of that type make it possible to envisage replacing shared type architectures as are commonly implemented, in particular on telecommunications networks, by architectures of lower cost where n waveguides connect n subscribers. In shared type architectures, a monomode fiber is shared between n subscribers and it is necessary to provide relatively expensive amplifiers and couplers on the network. Multi-core fiber architectures make it possible to omit such components.

However, until now, no optical component has been proposed that makes it possible to connect a multi-core fiber of the type described in FR-93 01674 to n individual fibers.

OBJECTS AND SUMMARY OF THE INVENTION

An object of the invention is thus to provide such a component, and also a method of making it.

To this end, the optical connection component of the invention comprises a plurality of optical fibers each comprising at least a light guide core surrounded by optical cladding, the fibers being united at a common end in such a manner that their claddings take up a mutually-tangential configuration and the axes of their cores are disposed in a configuration that corresponds to that of the axes of a multi-core fiber to which said common end is to be connected, said fibers being free from one another at their opposite ends.

It will be observed that such a connection component preferably has a high precision structure so as to avoid power losses between the cores of the multi-core fiber and the cores of the individual fibers to which the multi-core fiber is connected.

To this end, in the method of manufacture proposed by the invention:

a plurality of optical fibers are juxtaposed longitudinally, each fiber including at least one light-guiding core surrounded by optical cladding;

at least one drop of a liquid is deposited on the fibers so that the surface tension of the liquid draws together the claddings of said optical fibers in such a manner as to make them tangential to one another; and the brought-together claddings are "frozen" when the axes of the cores lie in a configuration corresponding to that of the axes of a multi-core fiber to which the component is to be connected.

The invention also provides a connection assembly including such a component and means for connecting it to a multi-core fiber.

BRIEF DESCRIPTION OF THE DRAWINGS

The following description is purely illustrative and non-limiting. It should be read with reference to the accompanying drawings, in which:

FIG. 1 is described above and is a cross-section view through a multi-core fiber;

FIG. 2 is a diagrammatic perspective view of a multi-core component of the invention;

FIG. 3 is a cross-section view through a connection component constituting one possible embodiment of the invention, the section being at its end for connection to the multi-core fiber of FIG. 1;

FIG. 4 is a perspective view of a rod used as a position-preinitiator element in one possible implementation of the method of the invention;

FIGS. 5a and 5b show two steps of the method;

FIGS. 8 to 10 show the means implemented in accordance with the invention for connecting fibers together;

FIG. 12 is a section view through a position initiator element used in one possible implementation of the invention;

FIG. 16 shows a connection component of the invention for splitting up a four-core fiber into two two-core fibers;

FIGS. 17 and 18 are section views analogous to FIG. 3 through connection components for connection to fibers respectively having seven cores and nine cores;

FIG. 19 is a plan view of the initiator element used in one possible implementation of the method of the invention for making the component of FIG. 18;

FIG. 20 shows a possible variant for initiating the fiber geometry of the connection component;

MORE DETAILED DESCRIPTION

Figure 6:
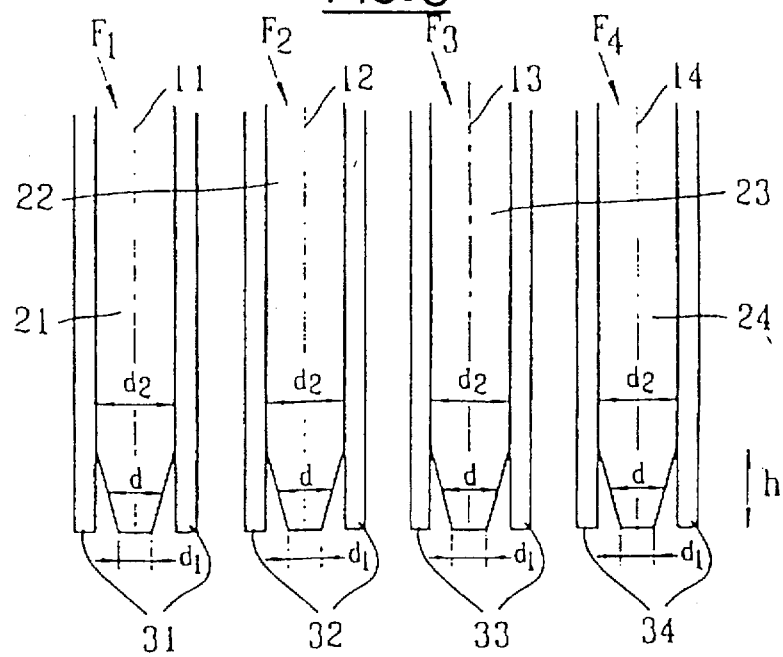
FIGS. 6 and 7 show two possible variants enabling the diameters of the optical cladding of the fibers to be reduced.

The connection component 1 shown in FIGS. 2 and 3 is made up of four fibers $F_1$ to $F_4$ that are assembled together at a common end and that are free at their opposite ends.

Each of the fibers $F_1$ to $F_4$ conventionally comprises a core 11 to 14 surrounded by optical cladding 21 to 24.

As shown in FIG. 3, the fibers $F_1$ to $F_4$ are tangential to one another at their common end, with their axes being disposed at the corners of a square $C_2$ that is highly accurate and that corresponds to the square $C_1$ of the multi-core fiber F of FIG. 1, with which the component 1 is to be connected.

The terms "high accuracy" and/or "great precision" are used herein to specify that the axes of the cores occupy positions that are defined to within a few tenths of a micrometer.

Given that the square $C_2$ is of the same size as $C_1$, each of the fibers $F_1$ to $F_4$ presents a diameter d of 44 μm at their common end; the fibers are inscribed in a circle $C_e$ having a diameter $D_e$ that is equal to 106 μm.

An implementation of the method of the invention for making the component 1 from four conventional silica fibers having optical cladding with a diameter of 125 μm is described below.

Initially, the four fibers $F_1$ to $F_4$ that are to be assembled together and while still covered in their mechanical coverings are placed in a preinitiator element so as to place the fibers in a geometrical configuration that is similar to the final disposition which it is desired to obtain. The preinitiator element may be constituted, for example, by a hollow rod of the same type as the rod 2 shown in FIG. 4. The rod 2 has four grooves 3 in the form of a cylindrical arcs, each having a diameter that corresponds to the diameter of the mechanical covering of a fiber.

The fibers $F_1$ to $F_4$ are held in the preinitiator 2 either by means of adhesive, or, preferably, mechanically.

Once held in place in the preinitiator 2, the ends of the fibers $F_1$ to $F_4$ remote from the preinitiator 2 are cut to a common height H from the preinitiator, as shown in FIG. 5a so that their ends which are to be assembled together coincide. In FIG. 5a and in the following figures, the mechanical coverings of the fibers $F_1$ to $F_4$ are shown and they are referenced 31 to 34.

The fibers $F_1$ to $F_4$ are then subjected to treatment for the purpose of reducing their outside diameters.

To this end, in a particularly advantageous variant of the invention, the fibers $F_1$ to $F_4$ are dipped together and without being striped, as shown by arrows T in FIG. 5b, into a chemical etching bath 4, e.g. a bath having hydrofluoric acid at a concentration of 48%, and they are left therein for a period of the order of a few minutes.

The hydrofluoric acid then rises by capillarity inside said mechanical coverings, and attacks the optical claddings 21 to 24 of the fibers $F_1$ to $F_4$. Thus, as shown in FIG. 6, each fiber $F_1$ to $F_4$ is removed from the bath 4 with its optical cladding 21 to 24 having an outside shape that is substantially frustoconical.

By way of example, fibers $F_1$ to $F_4$ have been obtained in this way, each having cladding 21 to 24 presenting a frustoconical end over a height h of about 7 cm, flaring from an end diameter $d_1$ of 20 μm to a diameter $d_2$ that corresponds to the 125 μm diameter.

Thus, at least one zone of these frustoconical ends has a diameter that is equal to the diameter d of 44 μm.

The mechanical covering 31 to 34 of each fiber $F_1$ to $F_4$ is then removed either chemically or mechanically or indeed by a combination of chemical and mechanical means. Under such circumstances, chemical means are used to separate the mechanical covering from the optical cladding and to facilitate mechanical removal thereof.

Naturally, in a variant, it is also possible to work directly with fibers whose outside diameter is 44 μm after fiber-drawing.

Figure 7:
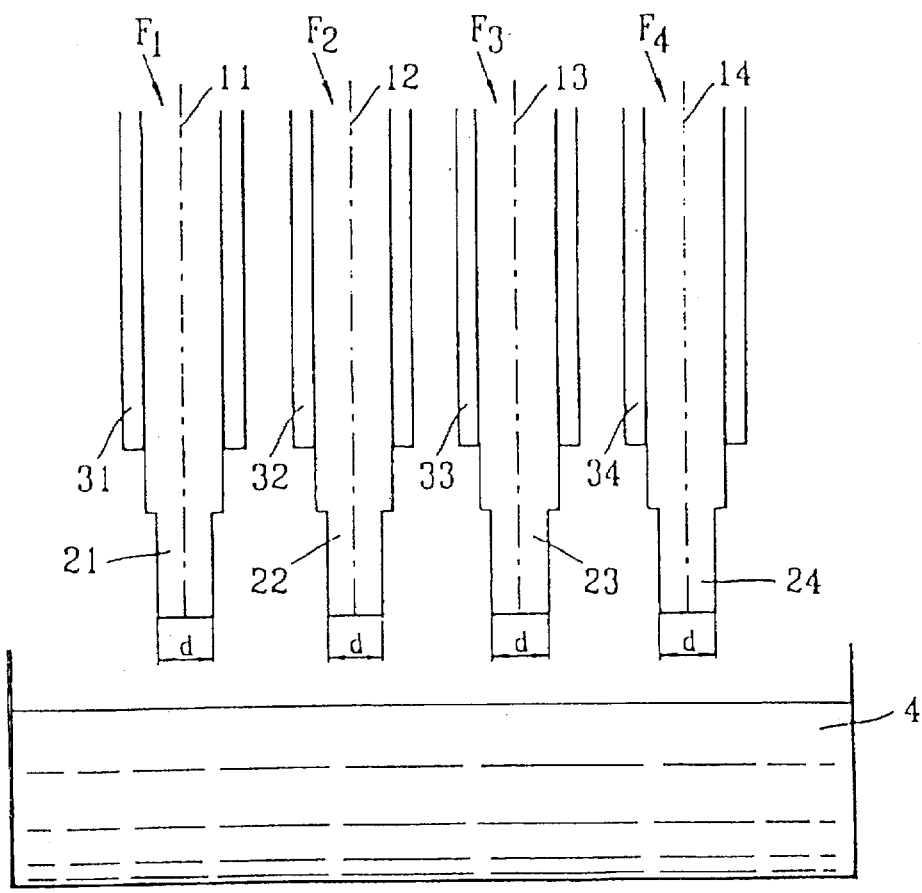

Also, and as shown in FIG. 7, it is possible to obtain the 44 μm diameter by dipping the stripped ends of the fibers $F_1$ to $F_4$ in the 48% hydrofluoric acid bath 4, with the mechanical coverings 31 to 34 being completely removed from said ends. Under such circumstances, the optical cladding 21 to 24 of each of the fibers $F_1$ to $F_4$ is reduced cylindrically in a manner that is controllable as a function of time.

Nevertheless, it should be observed that the first variant described above (optical cladding having frustoconical ends) does not require the dip time to be controlled accurately: it suffices for the dip time to be long enough to ensure that the terminal diameter of the optical cladding is less than the desired diameter (44 μm in the example described). This solution is therefore preferred.

As shown in FIGS. 8 and 9, once the positions of the fibers $F_1$ to $F_4$ have been preinitiated, and the ends of the fibers have optionally been prepared so that they present the desired diameter, they are brought together in application of the invention by depositing one or more drops $G_1$ of a liquid that has high surface tension. The surface tension $f_c$ represented by arrows in these figures has the effect of bringing together the four fibers $F_1$ to $F_4$.

The liquid is chosen for its high surface tension $f_c$ and for its compatibility with the fibers concerned. Examples of suitable liquids are ethanol and acetone. It may be observed that water, which has high values of surface tension, is not recommended for use with silica fibers since water is liable to attack silica.

As shown in FIG. 10, the drops $G_1$ of liquid are deposited on the fibers $F_1$ to $F_4$ in a zone thereof that is immediately beneath the preinitiator rod 2. The drops slide under gravity towards the ends of the fibers $F_1$ to $F_4$ that are to be brought together.

In FIG. 10, the rod 2 is supported by a bracket 5.

Figure 11:
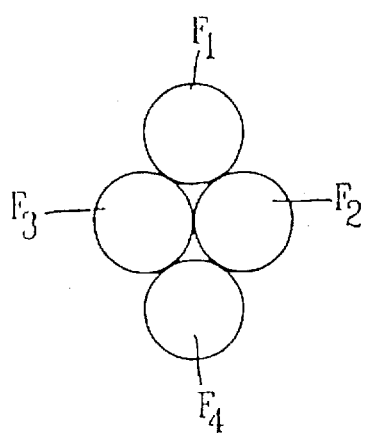
FIG. 11 shows one possible disposition of the fibers after they have been collected together.

Under the action of the surface tension of the drops, the four fibers $F_1$ to $F_4$ can take up two equilibrium positions:
   either a square configuration equilibrium position, as desired and as shown in FIG. 3;
   or a lozenge configuration equilibrium position as shown in FIG. 11.

In order to ensure that the desired square geometry is necessarily obtained, the brought-together ends of the fibers $F_1$ to $F_4$ are inserted into an initiator element 6 carried by the bracket 5 vertically below the preinitiator 2. As shown in FIG. 12, the element 6 is advantageously a glass capillary whose inside surface is circularly symmetrical and flared in shape.

The element 6 may be obtained, for example, from a cylindrical capillary having an inside diameter of 0.8 mm:

it is heated and drawn so as to impart thereto an inside shape that is reduced and that flares; and then its end of reduced size is cut in a zone where its inside diameter is accurately equal to the diameter $D_e$ of the 106 µm circle in which the fibers $F_1$ to $F_4$ must be inscribed at their assembled-together ends.

To determine accurately the zone of the drawn capillary which has a diameter of 106 µm, a calibrated metal thread having a diameter of 106 µm is inserted therein via its larger diameter opening: the end of the calibrated wire is stopped by the 106 µm inside diameter of the capillary.

The drawn capillary is then cut through slightly beneath the zone where the calibrated wire is stopped, after which it is polished using techniques that are conventional and known to the person skilled in the art, until the desired diameter is reached.

The four fibers $F_1$ to $F_4$ that have been assembled together by the drops of liquid $G_1$ are inserted into the initiator element 6 as obtained in this way via the flared end thereof.

When the fibers $F_1$ to $F_4$ are inserted into the initiator element 6, drops of acetone are deposited on the fibers $F_1$ to $F_4$ so as to hold said fibers together by surface tension, while also lubricating the inside walls of the initiator element 6. This minimizes the risks of the fibers breaking while they are being manipulated inside the initiator element 6.

When downwards motion of the fibers in the initiator element 6 is stopped, the operator subjects the four fibers $F_1$ to $F_4$ to small alternating rotary movements so as to force them to take up appropriate positions.

Once this operation has been performed, the zones of diameter d of the optical claddings 21 to 24 are inscribed in the circle of diameter $D_e$, as defined by the small diameter opening of said initiator element 6. The optical claddings then necessarily present the desired configuration and the axes of the cores together form the square $C_2$.

The fibers are then cut off at a distance of a few millimeters (2 mm to 4 mm) from the small-diameter opening of the initiator element 6, and the ends of the fibers $F_1$ to $F_4$ projecting from said initiator element 6 are then stuck together by means of adhesive so as to lock them in the square configuration obtained in this way.

As shown in FIG. 10, the ends may be dipped in a dish 7 of cyanoacrylate adhesive. The adhesive then rises by capillarity towards the initiator element 6.

It may be observed cyanoacrylate adhesive has the property of setting very quickly such that prior to reaching the opening of diameter $D_e$ of the initiator element 6 it sets.

Once this operation has been performed, the ends of the fibers $F_1$ to $F_4$ which project beyond the initiator element 6 are polished down to the 106 µm diameter, or better, they are left unpolished, with polishing then taking place at the moment of connection, as described below in detail.

In a possible variant of the invention, the fibers $F_1$ to $F_4$ are subsequently extracted from the initiator element 6. The assembled structure of their common ends is consolidated by depositing a drop of cyanoacrylate adhesive that moves down along said fibers $F_1$ to $F_4$.

Figure 13:
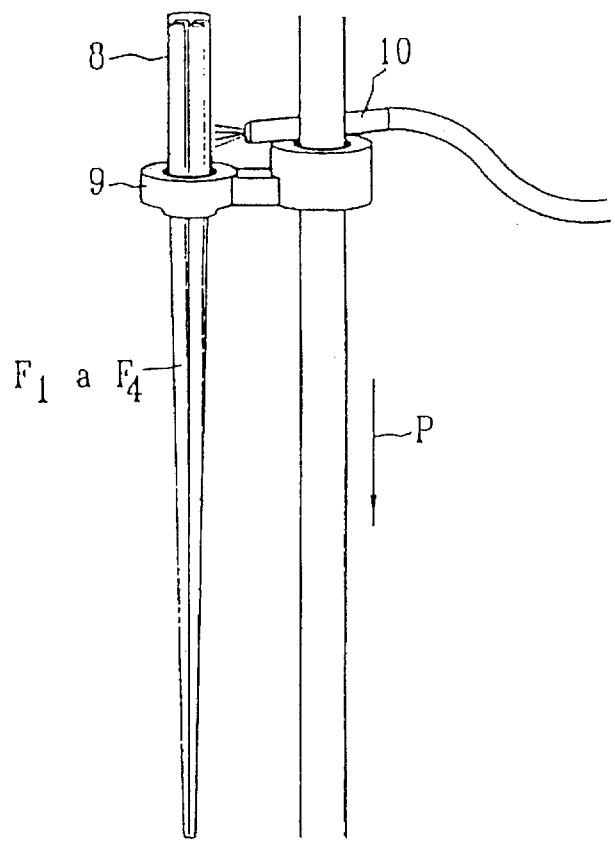
FIG. 13 shows a step of depositing a mechanical covering on the component of the invention.

Thereafter, as shown in FIG. 13, a mechanical covering 8 is deposited on the end of the fibers. This operation may be performed, for example, by programmed lowering (arrow P) of a deposition dish 9 along the zone where the fibers $F_1$ to $F_4$ are assembled together (such a dish is commonly called a "coating" dish), in association with means 10 for directing ultraviolet radiation onto the deposit for polymerization purposes.

With optical fibers having tapering ends, gradient deposition is provided so that the end of the final component where the fibers are assembled together presents a mechanical covering 8 which is cylindrical and which has an outside diameter that corresponds to the outside diameter of the mechanical coverings of conventional single fibers.

The resulting component 1 is therefore easy to use with conventional connector means.

The ends of the fibers $F_1$ to $F_4$ that are not connected to one another can be individually connected to respective conventional single-core optical fibers by ordinary connection means.

Figure 14:
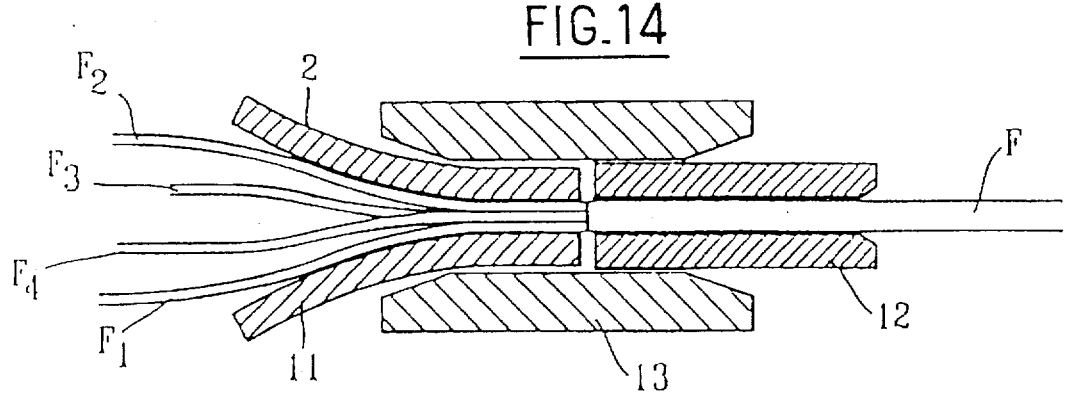
FIG. 14 shows a possible variant of the means for connecting a component of the invention to a multi-core fiber.

At its other end, the component 1 is connected to the multi-core fiber F as shown in FIG. 14 by conventional connector techniques that make use of endpieces 11 and 12 associated with a centering element 13 that receives the endpieces.

The relative positions of the multi-core fiber F and of the component 1 are adjusted so that the axes of the cores of the component 1 and the axes of the cores of the multi-core fiber F coincide.

The connection endpiece 11 that terminates the connection component 1 is advantageously constituted by the flared capillary 2 which was used as the initiator element.

Under such circumstances, the fibers $F_1$ to $F_4$ are not extracted from the capillary after they have been stuck together in their assembled position: a drop of cyanoacrylate adhesive is inserted via the larger-diameter end of the capillary so as to stick together the capillary 2 and the fibers $F_1$ to $F_4$.

The centering element 13 may be constituted by a zirconia-alumina ceramic rod whose end openings are flared, the centering rod 13 receiving the endpieces 11 and 12 of the connection component and of the multi-core fiber via opposite ends.

Such a centering element in association with the connection endpieces that it receives and in association with the component 1 constitutes an example of the connection assembly of the invention.

In a variant, it is also possible to use as the connection means a polarization-maintaining connector for individual fibers, of the type sold by Radiall under the name "connecteur MP". In this respect, reference may advantageously be made to the March 1992 Radiall catalog: "Connecteurs pour fibre optique-Monomode-VFO-MP" [Connectors for MP-VFO-monomode optical fibers]. In conventional manner, such a connector makes it possible firstly to center the axes of two individual polarization-maintaining monomode fibers, and secondly to adjust the relative angular position of the two fibers about their common axis.

Used together with the connection component of the invention, and a corresponding multi-core fiber, this makes it possible firstly to center the squares $C_1$ and $C_2$, and secondly to adjust the angular positions of the squares so that their axes coincide.

In another variant, the multi-core fiber F and the four-fiber component 1 may be stuck together with adhesive, their relative position having previously been adjusted on V-groove supports using appliances that enable the fibers to be moved with precision.

Figure 15:
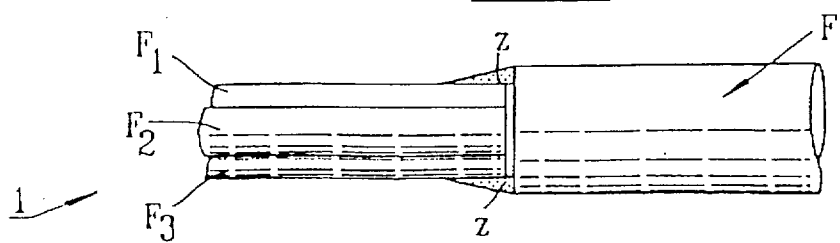
FIG. 15 shows another possible variant for connecting a component of the invention to a multi-core fiber.

In another variant, the multi-core fiber F and the component 1 may be assembled together, as shown in FIG. 15, by melting an end zone Z of the multi-core fiber F onto the end of the component 1. Such zone melting is performed by electric arc appliances that are conventionally used for welding fibers together.

It is also possible, advantageously, to implement the connection techniques described in FR-2 632 735.

The invention is described above in the context of connection to a fiber F that has four cores. The invention is naturally applicable more generally to connection to any multi-core fiber: to connecting p individual fibers to an n-core fiber, or to connecting one or more p-core fibers to an n-core fiber, where p is less than or equal to n. As shown in FIG. 16, it is also possible to split up a four-core fiber so as to constitute two two-core fibers.

As an additional example, FIG. 17 is a right section through the end of a component 101 for connection to a seven-core fiber. Six of the seven fibers 102 of this connection component 101 are distributed around a central fiber. The seven fibers 102 are tangential to one another in pairs and they are inscribed in a circle $C_e$. The technique described above for connection to a four-core fiber applies in the same manner, and the only difference is a change in the inside diameter of the initiator element.

For multi-core fiber configurations that are not circular, the inside shape of the initiator element needs to be modified accordingly.

Thus, FIG. 18 shows a component 201 for connection to a nine-core fiber, where the nine fibers 202 are inscribed in a square $C_a$.

An initiator element 203 is then used of the type shown in plan view in FIG. 19 which element has a flared inside shape whose small end opening has an internal outline that constitutes the square section $C_a$. This shape is easily obtained by inserting a nine-core silica multi-core fiber into a cylindrical capillary made of Pyrex and then heating and drawing the Pyrex tube. The melting temperature of Pyrex is 900° C., whereas that of the fibers is 2000° C., thus making it possible to draw the tube without changing the inside shape of the multi-core fiber. This provides an initiator whose smaller end section corresponds to that of the nine-core fiber.

It may also be observed that the initiator is not essential. In particular, it can be omitted when the fibers that are brought together have only one possible equilibrium position, as applies, for example, with a two-fiber connection component. As shown in FIG. 20, it is also possible to place a thread or fiber $F_c$ of calibrated outside diameter in the gap or gaps between the fibers $F_1$ to $F_4$, where the calibrated outside diameter is such that when the fibers $F_1$ to $F_4$ take up tangential positions thereagainst on being brought together by drops of liquid, then the calibrated thread (or fiber) $F_c$ constrains the optical fibers to take up the desired configuration. Thus, when bringing together four cores as described above, a thread $F_c$ having a diameter of 18 µm is placed between the fibers $F_1$ to $F_4$ that have an optical cladding diameter of 44 µm. The fibers $F_1$ to $F_4$ then necessarily take up a square configuration when they come together around the thread $F_c$.

The invention is described above in the context of fibers made of silica, however it is naturally also applicable to optical fibers made of plastic.

In another variant, the initiator element is advantageously a centering component for optical fibers, as shown in FIGS. 20 to 24, which component comprises a ferrule and a calibrated pellet which is applied to one end of the ferrule and which has a centering hole that extends the orifice of the ferrule.

The ferrule of such a component is not calibrated and it is therefore relatively cheap to manufacture.

In addition, given that the calibrated centering pellet is interchangeable, it is possible with such a component to use a single type of ferrule for making different types of centering.

Figure 21:
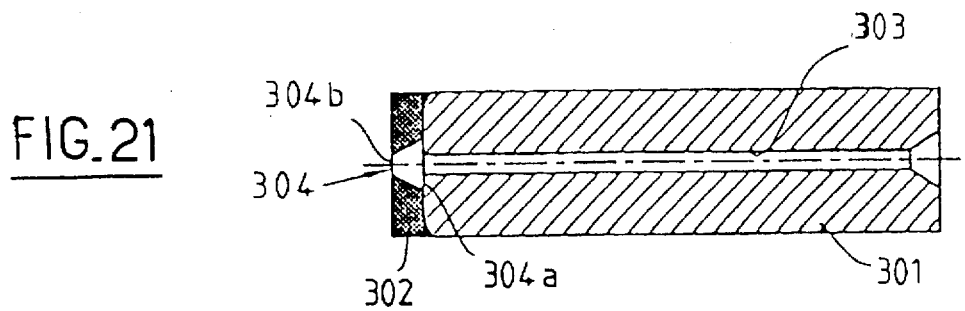
FIG. 21 is an axial section view through an initiator element for a connection component of the invention.

The component shown in FIG. 21 comprises a ferrule 301 and a centering pellet 302 that is fixed to one of the end edges of the ferrule 301.

The ferrule 301 is a ceramic tube whose outside shape is cylindrical. Its coaxial orifice 303 is not calibrated and its diameter is 200 µm, with the outside diameter of the ferrule being 2.5 mm, with tolerances of ±one part in a thousand on said dimensions.

The ferrule 301 may be made by molding, for example.

In a variant, the ferrule 301 may be made using other materials; it could be extruded.

At its end through which fibers are inserted into the ferrule 301, the ferrule orifice 303 flares significantly as a truncated cone directed towards the outside.

The pellet 302 is applied to the other end of the ferrule 301. It is held in place, in particular by adhesive against its interface with the ferrule 301.

Figure 22A:
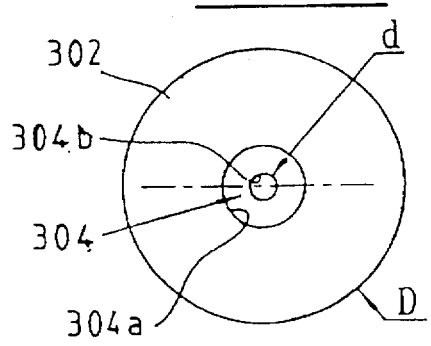
FIG. 22a is a face view of the end pellet of the FIG. 21 component.
Figure 22B:
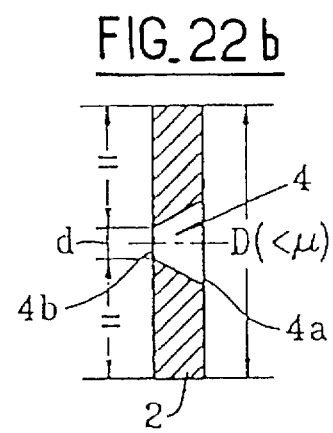
FIG. 22b is a side view of the same pellet.

The pellet 302 is shown in greater detail in FIGS. 22a and 22b.

It has a frustoconical hole 304 passing coaxially therethrough, with the larger diameter opening, referenced 304a, thereof being situated in the face of the pellet 302 that comes into contact with the end edge of the ferrule 301. Its smaller diameter opening is situated on the outside face of the pellet 302 and is referenced 304b.

The outline of the pellet 302 and its frustoconical conical hole 304 are both calibrated. Calibration conditions may be as follows, for example:

the outside diameter D of the pellet 302 is accurate to within less than one micron;

the frustoconical conical hole 304 and the outline of the pellet 302 are accurately concentric; and the diameter d of the smaller opening 304b of the hole 304 is likewise accurate to within less than one micron.

When centering n fibers each having cladding with a diameter of 125 µm, the diameter D is 2.5 mm±0.5 µm, while the diameter d is n×125 µm±0.5 µm.

The smaller opening 304b of the pellet 302 then has a shape and an outline such that the cladding of the fibers from which the connection component is made is necessarily inscribed in the deposition that is required for the common ends.

The fibers of the connection component are brought together and then inserted and locked into place in the centering component. Thus, possibly after optional polishing of the ends of the fibers, a multi-core fiber connection component is thus obtained having a connection endpiece constituted by the centering component as described above.

Naturally, the smaller opening 304b of the hole 304 through the pellet 302 may have a shape other than circular. For example, for a centering component that is used with connectors for nine-core fibers, the opening 304b is advantageously square in shape.

The pellet 302 is advantageously made of a material having a crystalline structure that makes high precision machining possible, e.g. sapphire or ruby, which materials confer very good surface states to the pellet 302 and to its orifice 304.

The pellet 302 may also be machined in glass or in any metal or ceramic sintered material.

In another variant, the pellet 302 may be made by molding a filled plastics material.

Figure 23:
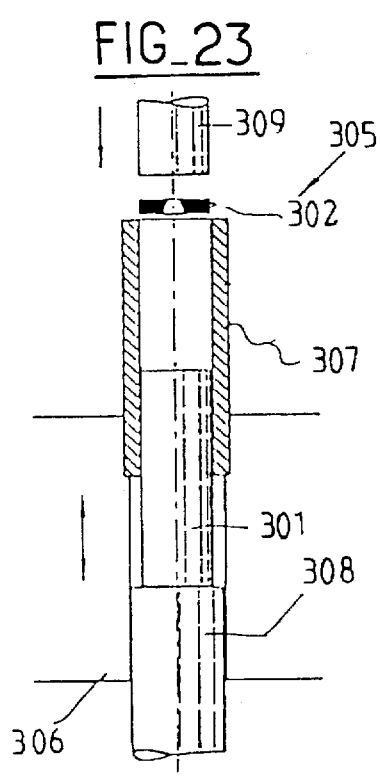
FIG. 23 shows how the initiator element is made up.

Assembly of the FIG. 21 component is shown in FIG. 23.

Such assembly is performed by means of an appliance 305 which mainly comprises, on a support 306: a split cylindrical guide ring 307 and two pistons 308 and 309 which slide coaxially relative to the split ring.

The piston 308 inserts the ferrule 301 into the split ring 307 so that the end edge thereof can come into contact with the adhesive-coated pellet 302. In addition, the piston 309 positions the pellet 302 on the end edge of the ferrule 301.

Once the ferrule 301 and the pellet 302 have been stuck together, the piston 308 is withdrawn from the spilt ring 307 and the resulting final component is ejected.

Once centered and stuck into place, the pellet 302 can be reinforced by an annular fillet of optionally filled adhesive.

Figure 24A:
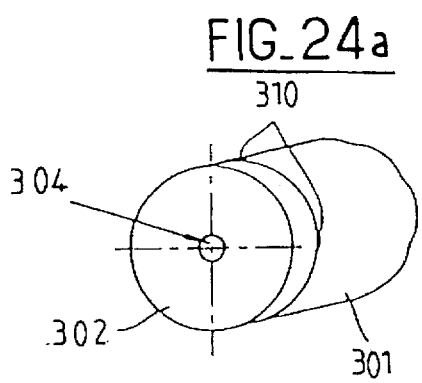
FIG. 24a is a perspective view of the centering component of FIG. 21, showing details of the bonding between the ferrule and the pellet of the component.
Figure 24B:
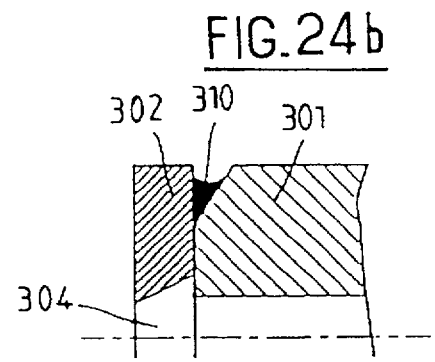
FIG. 24b is a section view also showing a detail of the bonding between the pellet and the ferrule of the component shown in FIG. 21.

Also, as shown in FIGS. 24a and 24b, the pellet 302 and the end edge of the ferrule 304 may be welded together at a plurality of points 310 (e.g. laser spot welding).

The appliance 305 of FIG. 23 may be an automatic machine used for mass-producing centering components in a factory. It may also be a simple tool for on-site assembly.

The centering component as described above is advantageously applicable as a connection endpiece for connection components of the invention for multi-core fibers.

We claim:

1. A connection assembly comprising:

an optical connection component which includes a plurality of optical fibers each optical fiber having at least a light guide core surrounded by optical cladding, the fibers being united at a common end in such a manner that their claddings take up a mutually-tangential configuration the axes of their cores are disposed in a configuration that corresponds to that of the axes of a multi-core fiber to which said common end is to be connected, said fibers being free from one another at their opposite ends; and means for connecting the end of said component where its fibers are united to the end of a multi-core fiber.

2. The connection assembly of claim 1, including a connection endpiece in which the fibers are disposed at their common end.

3. The connection assembly of claim 2, wherein the connection endpiece has an end inside outline in which the fibers are necessarily inscribed in the configuration that they are required to take up.

4. The connection assembly of claim 2, wherein the connection endpiece is a component comprising a ferrule and a calibrated pellet which is applied to one end of the ferrule and which has a centering hole that extends the orifice of the ferrule.

5. The connection assembly of claim 4, wherein the outline and the centering hole of the pellet are calibrated with accuracy to within less than 1 μm.

6. The connection assembly of claim 4, wherein the pellet and the ferrule are coupled together by one of adhesive and weld at a plurality of points.

7. The connection assembly of claim 1, wherein the pellet is constructed by one of molding out of a filled plastics material and machining out of a material selected from glass, sapphire, ruby, or any metal or ceramic sintered material.

8. The connection assembly of claim 2, wherein the connection endpiece is a flared capillary.

9. The connection assembly of claim 1, including a mechanical covering surrounding the fibers in the vicinity of their common end, said mechanical covering having an outside shape that is substantially cylindrical.

10. The connection assembly of claim 1, comprising four fibers whose core axes occupy, in cross-section at their common end, the vertices of a square.

11. The connection assembly of claim 3, wherein the outline and the centering hole of the pellet are calibrated with accuracy to within less than 1 μm. and wherein the smaller section end of the connection endpiece has an inside circular outline of diameter $2\sqrt{2}d$ where d is the diameter of the cladding of each of the optical fibers at said common end.

12. The connection assembly of claim 2, including a centering element that receives the connection endpiece of the component, and also a connection endpiece of the multi-core fiber.

13. A method of making an optical connection component with an end that can be connected to a multi-core fiber, the method comprising:

assembling a plurality of optical fibers juxtaposed longitudinally, each fiber including at least one light-guiding core surrounded by optical cladding;

depositing at least one drop of a liquid on the fibers so that the surface tension of the liquid draws together the claddings of said optical fibers in such a manner as to make them tangential to one another; and securing the drawn claddings when the axes of the cores lie in a configuration corresponding to that of the axes of a multi-core fiber to which the component is to be connected.

14. The method of claim 13, wherein, prior to the step of securing the claddings, the brought-together claddings are inserted into an initiator element designed to ensure that a determined configuration is necessarily imparted to the fibers.

15. The method of claim 14, wherein the initiator element is a flared capillary whose smaller section end has an internal outline in which the claddings of the optical fibers are necessarily inscribed in a determined configuration.

16. The method of claim 13, wherein the claddings are secured by means of adhesive in the zone where the fibers are brought together.

17. The method of claim 15, wherein the claddings are secured by means of adhesive in the zone where the fibers are brought together, and wherein the claddings of the fibers are stuck together in the capillary.

18. The method of claim 13, wherein the claddings are chemically etched in order to reduce their outside diameters in the vicinity of the zone where they are brought together.

19. The method of claim 18, wherein the ends of the fibers are dipped in a chemical etching bath.

20. The method of claim 19, wherein the ends of the fibers are dipped in a chemical etching bath while they are still covered in their mechanical coverings, such that the claddings as removed from said bath are substantially frusto-conical in shape.

* * * * *